(12) United States Patent
Hartford et al.

(10) Patent No.: US 9,582,546 B2
(45) Date of Patent: Feb. 28, 2017

(54) SPECIFICITY FOR NAMING BASED ON LOCATION

(71) Applicant: Navteq B.V., Veldhoven (NL)

(72) Inventors: Stephen Andrew Hartford, San Jose, CA (US); Albert William Biggerstaff, Los Altos, CA (US)

(73) Assignee: HERE Global B.V., Eindhoven (NL)

( * ) Notice: Subject to any disclaimer, the term of this patent is extended or adjusted under 35 U.S.C. 154(b) by 249 days.

(21) Appl. No.: 13/778,345

(22) Filed: Feb. 27, 2013

(65) Prior Publication Data

US 2014/0244665 A1   Aug. 28, 2014

(51) Int. Cl.
*G06F 7/00* (2006.01)
*G06F 17/30* (2006.01)

(52) U.S. Cl.
CPC .... *G06F 17/3053* (2013.01); *G06F 17/30241* (2013.01); *G06F 17/30265* (2013.01); *G06F 17/30528* (2013.01)

(58) Field of Classification Search
CPC ........... G06F 17/30265; G06F 17/3053; G06F 17/30528; G06F 17/30241
See application file for complete search history.

(56) References Cited

U.S. PATENT DOCUMENTS

| | | | |
|---|---|---|---|
| 6,657,666 B1 * | 12/2003 | Imagawa et al. | 348/333.02 |
| 6,690,883 B2 | 2/2004 | Pelletier | |
| 7,978,232 B1 * | 7/2011 | Khan | 348/231.3 |
| 2004/0021780 A1 * | 2/2004 | Kogan | 348/231.3 |
| 2007/0239778 A1 * | 10/2007 | Gallagher | 707/104.1 |
| 2007/0276845 A1 | 11/2007 | Geilich | |
| 2008/0133526 A1 * | 6/2008 | Haitani | G06F 17/30265 707/7 |

(Continued)

FOREIGN PATENT DOCUMENTS

| WO | WO2011051091 | 5/2011 |
|---|---|---|
| WO | WO2013000153 | 1/2013 |

OTHER PUBLICATIONS

International Search Report and Written Opinion in PCT/EP2014/053510, mailed Apr. 22, 2014.

(Continued)

*Primary Examiner* — Marc Somers
(74) *Attorney, Agent, or Firm* — Lempia Summerfield Katz LLC

(57) ABSTRACT

In one embodiment, location-based names are selected for a digital object based on a user's familiarity with the geographic location where the digital object was generated. For example, a memory stores multiple names indicative of the same geographic location. The multiple names may include a street address, a city, and a state, where each defines a different level of location specificity. The device that generates the digital object also collects familiarity data for the geographic location and calculates a familiarity score for the digital object based on the familiarity data for the user or the device. If the familiarity score is above a threshold, the user of the device is familiar with the geographic location, and a specific name is associated with the digital object. If the familiarity score is below the threshold, the user of the device is not familiar with the geographic location, and a broader name is associated with the digital object.

17 Claims, 11 Drawing Sheets

(56) References Cited

U.S. PATENT DOCUMENTS

| | | | |
|---|---|---|---|
| 2009/0077129 A1* | 3/2009 | Blose | H04N 1/00153 |
| | | | 707/104.1 |
| 2009/0143984 A1* | 6/2009 | Baudisch | G01C 21/36 |
| | | | 701/300 |
| 2011/0055224 A1 | 3/2011 | Rossio et al. | |
| 2011/0099199 A1 | 4/2011 | Stalenhoef et al. | |
| 2011/0227699 A1* | 9/2011 | Seth et al. | 340/8.1 |
| 2011/0235858 A1 | 9/2011 | Hanson et al. | |
| 2011/0280497 A1 | 11/2011 | Berger et al. | |
| 2012/0030575 A1 | 2/2012 | Cok | |
| 2012/0301039 A1 | 11/2012 | Maunder et al. | |
| 2013/0129232 A1 | 5/2013 | Cok et al. | |
| 2014/0089223 A1* | 3/2014 | Klassen | G06Q 30/02 |
| | | | 705/347 |
| 2014/0250126 A1 | 9/2014 | Baldwin et al. | |

OTHER PUBLICATIONS iMovie '08, Getting Started, 2008, Apple Inc.

L. Kennedy et al., How Flickr Helps us Make Sense of the World: Context and Content in Community Contributed Media Collections, Sep. 23-28, 2007, Yahoo! Research, Berkeley, CA.

N. Savage et al., Seems Familiar: An Algorithm for Inferring Spatial Familiarity Automatically, accessed Feb. 5, 2013, Computer Science Department, University of California, Santa Barbara, CA.

Norma Saiph Savage et al., "Seems Familiar: An Algorithm for Inferring Spatial Familiarity Automatically", Computer Science Department, University of California, Santa Barbara, accessed Feb. 5, 2013.

* cited by examiner

SPECIFICITY FOR NAMING BASED ON LOCATION

FIELD

The following disclosure relates to specificity for naming based on location, or more particularly, a naming convention for location-based naming that varies according to familiarity of a user with the location.

BACKGROUND

Digital photography has become ubiquitous. Many people carry a digital camera every day in the form of a smart phone. Smart phones include data storage sufficient for thousands of photographs. However, smart phones are particularly inconvenient for cataloging and organizing photographs. One system for cataloging photographs involves geocoding and reverse geocoding.

Geocoding is the process of finding associated geographic information, such as geographic coordinates of latitude and longitude, from geographic information of a different format, such as a query including the street address. Reverse geocoding is the process of associating textual location such as a street address, from geographic coordinates. However, geocoding and reverse geocoding are typically inflexible. The street addresses retrieved from reverse geocoding may be meaningless to some users. For example, the street address of "Champ de Mars, 5 Avenue Anatole France, 75007 Paris, France" may have little meaning to Americans, but Parisians may be able to identify the address as the Eiffel Tower.

SUMMARY

In one embodiment, location-based names are selected for a digital object based on a user's familiarity with the geographic location where the digital object was generated. For example, a memory stores multiple names indicative of the same geographic location. The multiple names may include a street address, a city, and a state, where each defines a different level of location specificity. The device that generates the digital object also collects familiarity data for the geographic location and calculates a familiarity score for the digital object based on the familiarity data for the user or the device. If the familiarity score is above a threshold, the user of the device is familiar with the geographic location, and a specific name is associated with the digital object. If the familiarity score is below the threshold, the user of the device is not familiar with the geographic location, and a broader name is associated with the digital object.

BRIEF DESCRIPTION OF THE DRAWINGS

Exemplary embodiments of the present invention are described herein with reference to the following drawings.

DETAILED DESCRIPTION

People interact with an increasing number of digital objects via computing devices such as smartphones and tablets. The digital objects may be photographs, documents, emails, text messages, contacts or any data file type generated by a computer. Attributes of the digital object (e.g., metadata) may be used to identify and group the objects. Location based naming uses metadata assigns names to digital objects based on a geographic location of a device that generates the object. However, this metadata is displayed without regard to whether the data will be meaningful to the user.

To avoid presenting meaningless data to users, the metadata may be specifically tailored to a user. For example, the familiarity of the user with the geographic location may impact the specificity of location based names. In one specific example, when a photograph of the Chicago Bean is displayed to a California resident, the name "Chicago" is used, but when the same photograph is displayed to a Chicago resident, the name "Millennium Park" is used. Likewise, photographs may be grouped according to familiarity with the location. For example, the photograph of the Chicago Bean, a photograph of the Willis Tower, and a photograph of Wrigley Field are organized together under the index "Chicago" for the California resident, but may be grouped separately for the Chicago resident, using the neighborhoods Millennium Park, the Loop, and Lakeview. Similarly, documents, communications, or contacts may be organized according to locations where the data was created and the familiarity of the location of the user accessing the data.

The knowledge and experiences of a given user or group of users with a particular geographic area is measured based on user activity. The user activity may include places that the user has visited, taken pictures near, once lived, or read about. The user activity may include content that the user has viewed or contributed. By examining the user activity, digital objects may be organized and/or named in ways that are easily understandable.

Figure 1:
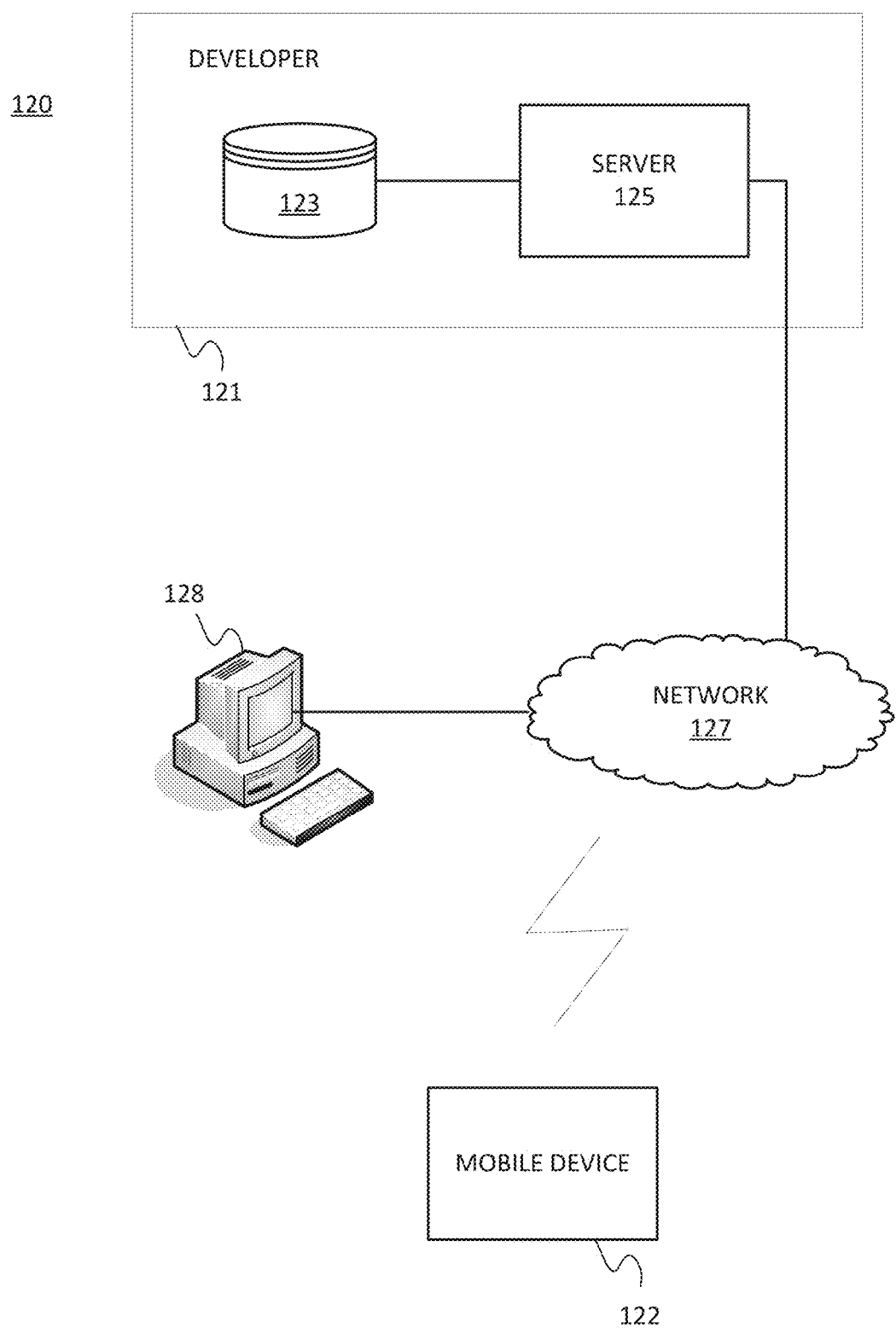
FIG. 1 illustrates an example system for location based naming.

FIG. 1 illustrates an exemplary navigation system 120. The navigation system 120 includes a developer system 121, a mobile device 122, a workstation 128, and a network 127. Additional, different, or fewer components may be provided. For example, many mobile devices 122 and/or workstations 128 connect with the network 127. The developer system 121 includes a server 125 and a database 123. The developer system 121 may include computer systems and networks of a system operator (e.g., NAVTEQ or Nokia Corp.).

The server 125 or database 123 may be configured to store multiple names for various geographic locations. Each of the names for a geographic location includes a different level of specificity. For example, a coordinate pair (e.g., latitude and longitude) may be associated with any combination of a street address, a neighborhood, a city, a county, a region, a state, a county, and a continent. The set of names for the same geographic location may be referred to as a geo-coding chain or a geo-coding tree.

The server 125 is configured to compute the level of specificity appropriate for a digital object with respect to a specific user or computing device. The digital object may be any type of file. Examples of digital objects include photographs, emails, text messages, contacts, or online postings. The digital object may be generated by the mobile device 122 while at a current geographic location. The level of specificity may be determined according to a familiarity score indicative of how familiar a particular user is with the geographic location. The familiarity score is calculated based on familiarity data for the current geographic location. The familiarity data may be received from the mobile device 122 or otherwise collected by the server 125.

The familiarity data may describe user activity or activity of the mobile device 122. For example, the familiarity data may indicate how many photographs at (or within a specific distance to) the current geographic location the mobile device 122 has generated. The quantity of photographs or other digital objects generated near the geographic location may be directly proportional to the familiarity score. The distance of each of the other digital objects from the geographic location may define a weight for calculating the familiarity score (i.e., closer digital object more strongly influence the familiarity score than farther digital objects). In addition or in the alternative, the familiarity data may depend on a frequency or duration that the mobile device 122 has been at (or within a specific distance to) the geographic location of the digital object. The distance from the mobile device 122 to the geographic location of the digital object may be proportional to the familiarity score. The familiarity data may include other factors such as whether the mobile device 122 has accessed websites related to the current geographic location, sent or received emails related to the current geographic location, or includes contacts that live or have frequented the current geographic location. The familiarity score may be calculated based on any combination of these examples.

The server 125 is configured to compare the familiarity score to one or more thresholds to select one of the multiple names. In one example with two levels of specificity, digital objects with familiarity scores above the threshold are assigned a specific location based name, and digital objects with familiarity scores below the threshold are assigned a general location based name. The server 125 may store the digital object in combination with the selected location based name. The server 125 may send the location based name to the mobile device 122 in order to label the digital object for display or organize the digital object. The calculations for the familiarity score and the assignment of the names for the digital object may be performed on a per-user basis. Different users may have different familiarity scores for the same digital object and assigned different names for the same digital object.

Figure 2A:
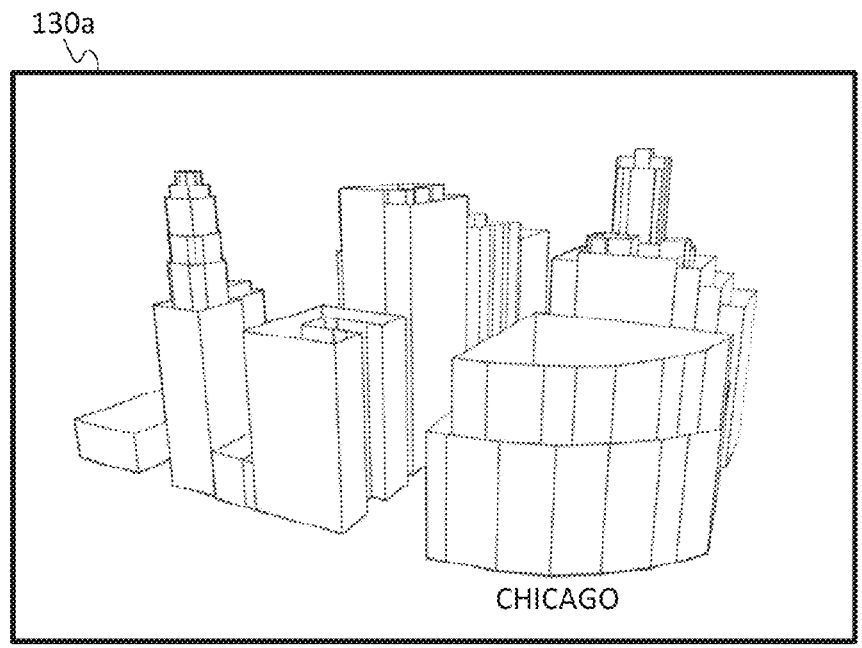
FIGS. 2A and 2B illustrates an example photograph with varying levels of geographic naming.
Figure 2B:
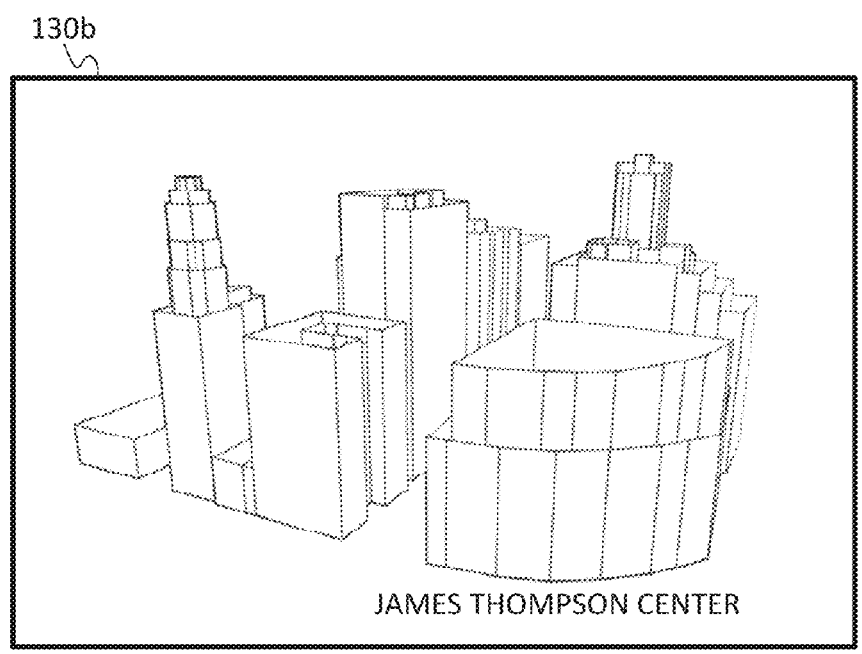
Figure 3A:
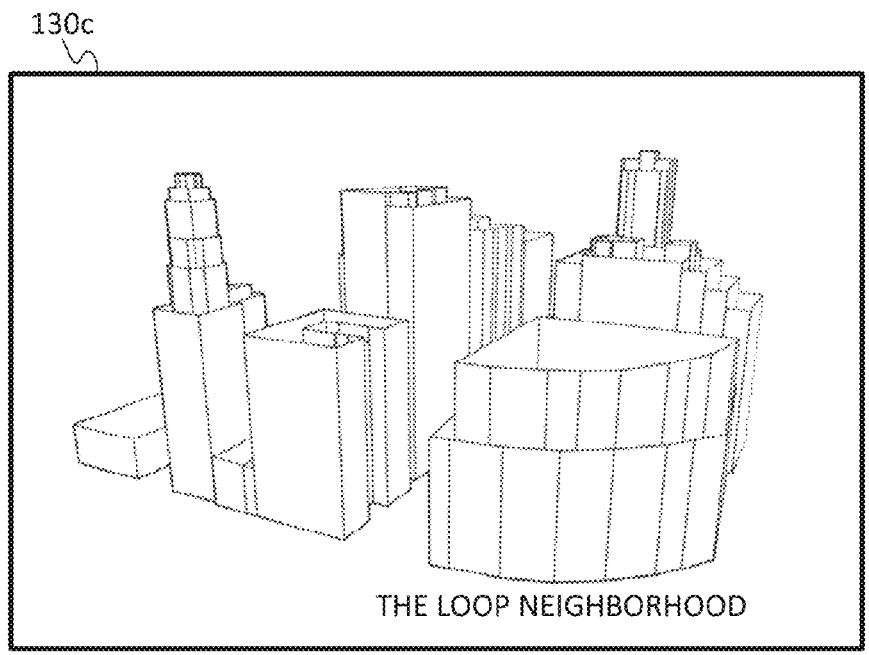
FIGS. 3A and 3B illustrates an example photograph with varying levels of geographic naming.
Figure 3B:
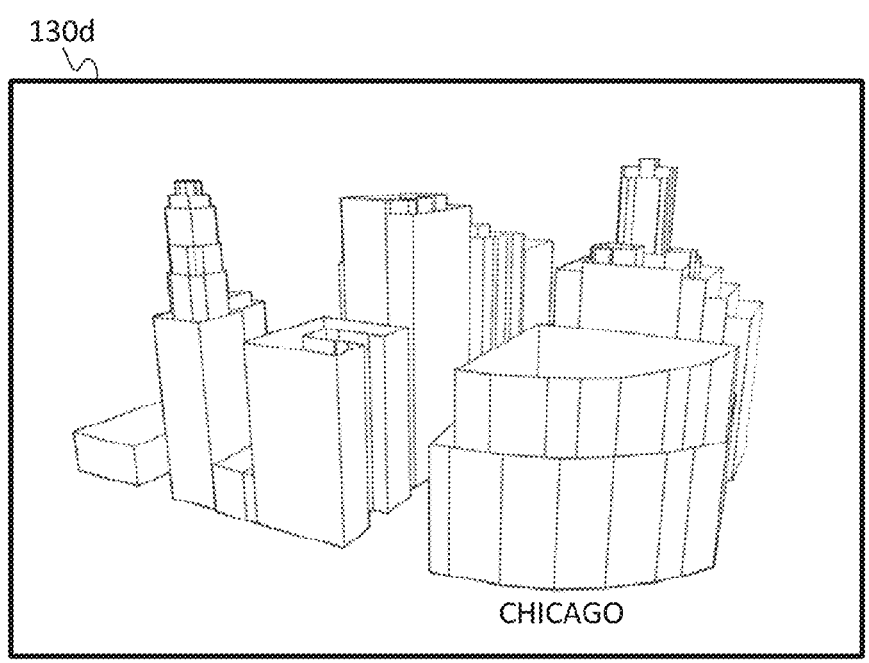
Figure 4A:
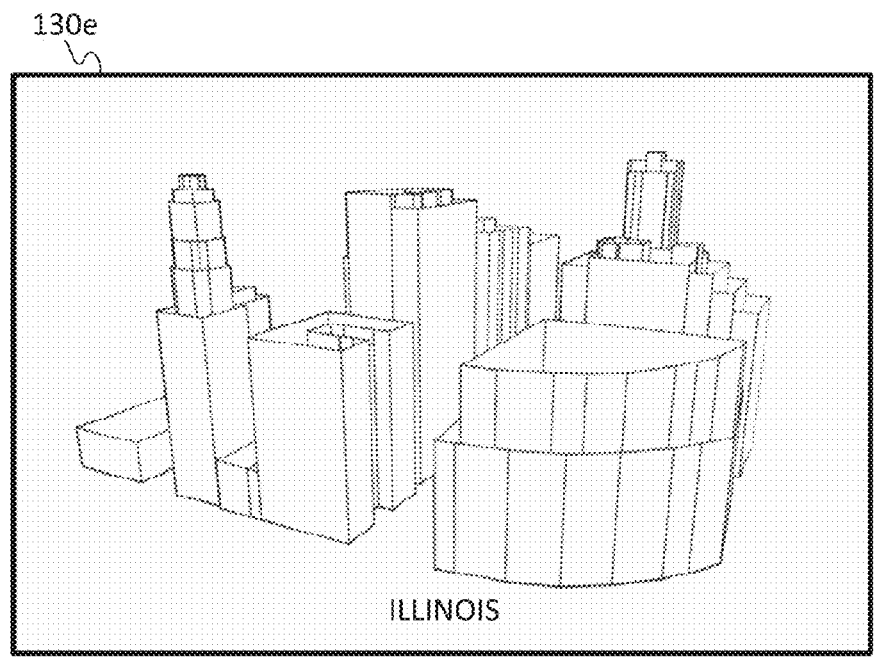
FIGS. 4A and 4B, illustrates an example photograph with varying levels of geographic naming.
Figure 4B:
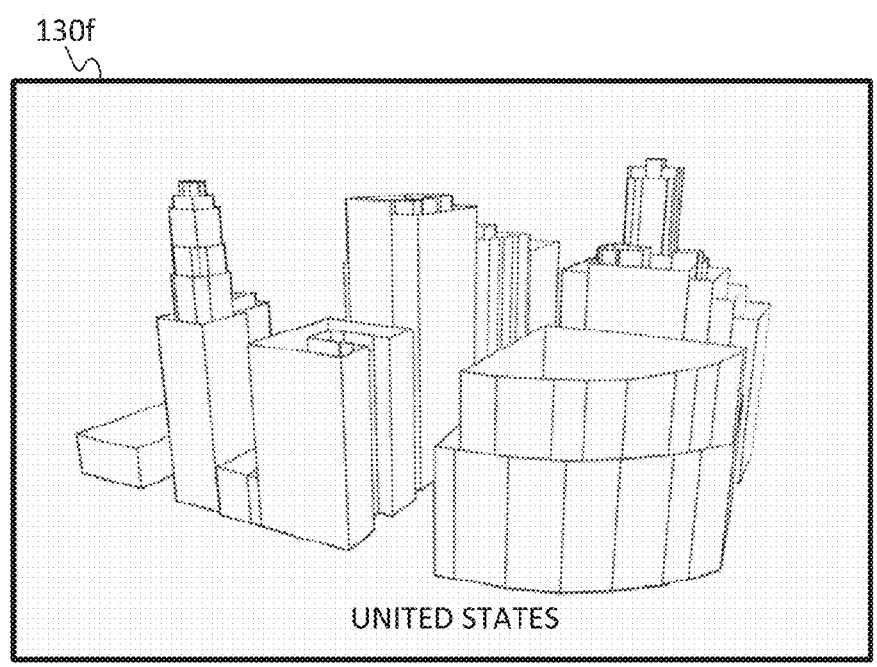

FIGS. 2A and 2B illustrate an example photograph of a point of interest (POI) with varying levels of geographic naming. Users with a relatively low familiarity score may be assigned a name including the city (e.g., Chicago), as shown by POI view 130a in FIG. 2A. The low familiarity score is below the threshold. Users with a relatively high familiarity score may be assigned a more descriptive or localized name (e.g., James Thompson Center), as shown by POI view 130b in FIG. 2B. The low familiarity score is below the threshold.

In the case of photographs, the assigned name may describe the content of the photograph (i.e., objects depicted in the photograph). The names of objects in the photograph may be manually entered by the user. The manually entered name (e.g., Old Iron Bridge) may be assigned for other users with high familiarity scores, but a generic name (e.g., Indiana) may be assigned for users with low familiarity scored. In addition or in the alternative, a POI name from the geographic database within a distance to the geographic location may be automatically assigned and describe objects depicted in the photograph. The automatically assigned POI may be assigned for users with a high familiarity score and a more generic name assigned for users with a low familiarity score.

FIGS. 3A, 3B, 4A, and 4B illustrate another example photograph of a point of interest (POI) with varying levels of geographic naming. For example, three thresholds may be used to separate familiarity scored into four levels of specificity. The levels of specificity may be a neighborhood, as shown by view 130c in FIG. 3A, a city or town, as shown by view 130d in FIG. 3B, a state, province, or small region, as shown by view 130e in FIG. 4A, and a country or large region, as shown by view 130f FIG. 4B.

Figure 5A:
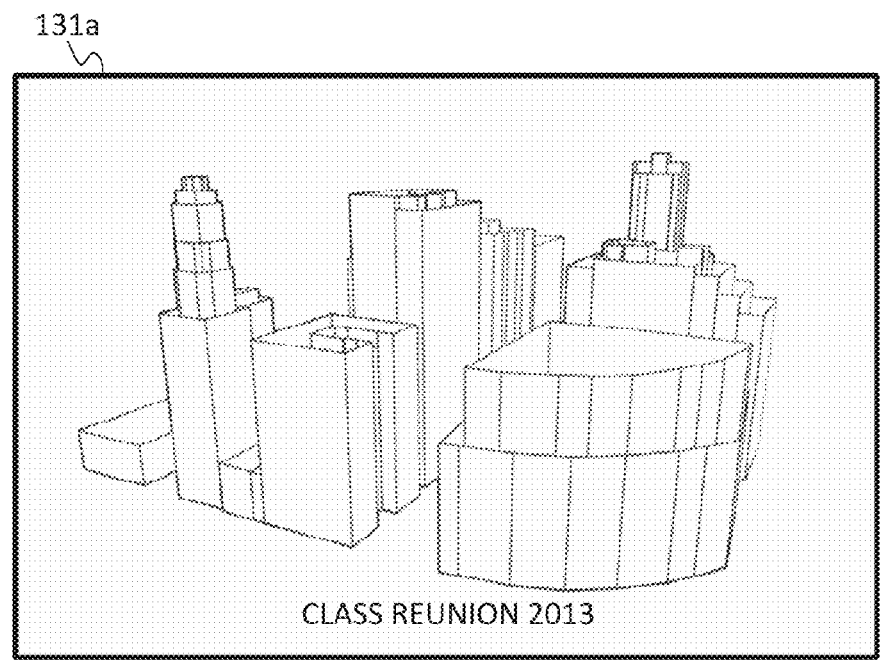
FIGS. 5A and 5B, illustrates an example photograph with varying levels of naming.
Figure 5B:
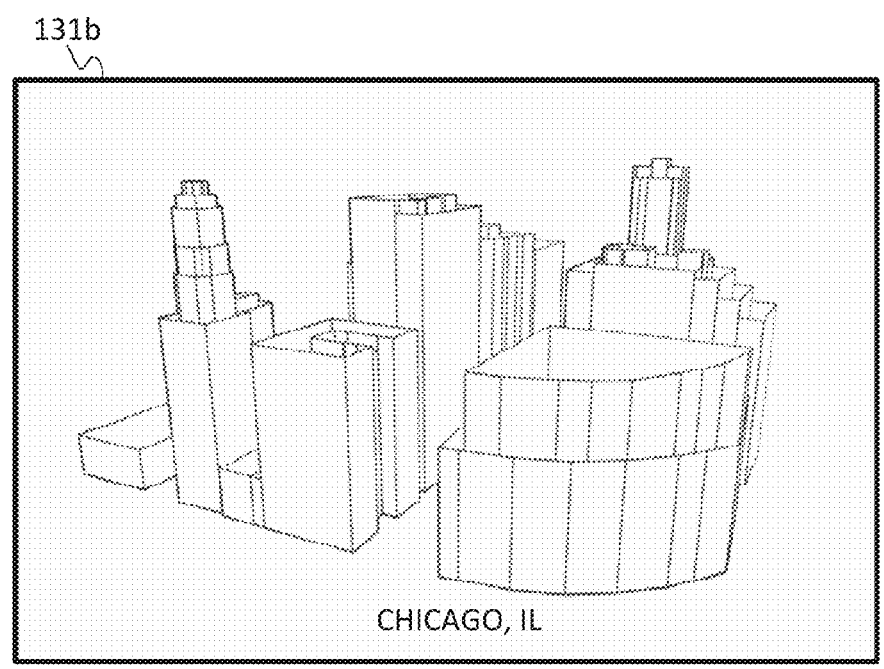

FIGS. 5A and 5B illustrate another example photograph of a point of interest (POI) with varying levels of geographic naming. The familiarity score may also be defined by a social network. For example, when an object is viewed on a social network by multiple users, the user that created the digital object as well as the user's immediate contacts or friends may be assigned a high familiarity score and receive a descriptive name for the digital object such as "Class Reunion 2013," as shown by view 131a in FIG. 5A. The descriptive name may be personalized. For example, the descriptive name may be extracted from the user's online calendar or social network event list. The digital object may have been associated with the descriptive name by another user. For users that are not contacts or friends with the user that generated the digital object, a low familiarity score may be assigned, and a more generic name for the digital object is assigned such as "Chicago, Ill.," as shown by view 131b in FIG. 5B.

The digital objects may be organized in libraries according to familiarity scores. The libraries may comprise folders that are defined according to individual users. The folders may have different levels of specificity based on the familiarity scores. For example, if an entire photo gallery on the mobile device 122 includes 10,000 photos, with 20 of those taken in France and the rest in the United States, the 20 from France may be grouped in a folder labeled "France," and the other 9,080 photos are broken down into more specific folders. It may not useful to name the "France" photos after the specific street names because the particular user of this mobile device 122 is not that familiar with France. Thus, the server 125 may calculate a low familiarity score for the France photos based on the makeup of the entire photo gallery. Conversely, 40% of the photos on the mobile device 122 were collected in a single neighborhood, the user is likely familiar with street names, and this more specific information is more likely to be known to the user ("Stevens Creek Blvd." instead of just "San Jose").

The same digital object may be assigned a different familiarity score, and accordingly, a different location based name, depending on the mobile device or user that is accessing the digital object. For example, a user takes a photograph at home, which is assigned a high familiarity score and the name "home" or "123 Main Street." The user sends the photograph to another user in the same town. When the second user access the photograph, a medium familiarity score is assigned, and the name "New York" or "Queens" is used. The user sends the photograph to another user in another country, a low familiarity score is assigned and the name "New York" or "America" is used. Likewise, the digital object may be accessed via website or social networking services by the three users, who each see a different location based name on the website or social networking service based on individual familiarity scores for the digital object.

The familiarity score may also be assigned to a group of people collectively. For instance, if a user posts a photo with location to a social network where the user's 20 friends or contacts can view the photo, the average familiarity with that location may be calculated to determine to assign an average familiarity score for the group. The location based name used for the group of people. Alternatively, the lowest familiarity may be used to ensure more recipients understand the name at the expense of specificity. In some instances, each member of a group should see the same name (e.g., within a family, social networking groups).

The mobile device 122 is a smart phone, a mobile phone, a personal digital assistant ("PDA"), a tablet computer, a notebook computer, a personal navigation device ("PND"), a portable navigation device, and/or any other known or later developed portable or mobile computing device. The mobile device 122 includes one or more detectors or sensors as a positioning system built or embedded into or within the interior of the mobile device 122. The mobile device 122 receives location data from the positioning system.

The optional workstation 128 is a general purpose computer including programming specialized for the following embodiments. For example, the workstation 128 may receive user inputs for defining the threshold level of the familiarity score. The workstation 128 may receive user inputs for modifying the levels of specificity applied to particular users. The workstation 128 includes at least a memory, a processor, and a communication interface.

The developer system 121, the workstation 128, and the mobile device 122 are coupled with the network 127. The phrase "coupled with" is defined to mean directly connected to or indirectly connected through one or more intermediate components. Such intermediate components may include hardware and/or software-based components.

The computing resources may be divided between the server 125 and the mobile device 122. In some embodiments, the server 125 performs a majority of the processing ("server-based embodiments"). In other embodiments, the mobile device 122 or the workstation 128 performs a majority of the processing ("endpoint-based embodiments"). In addition, the processing is divided substantially evenly between the server 125 and the mobile device 122 or workstation 128 ("hybrid embodiments").

Figure 6:
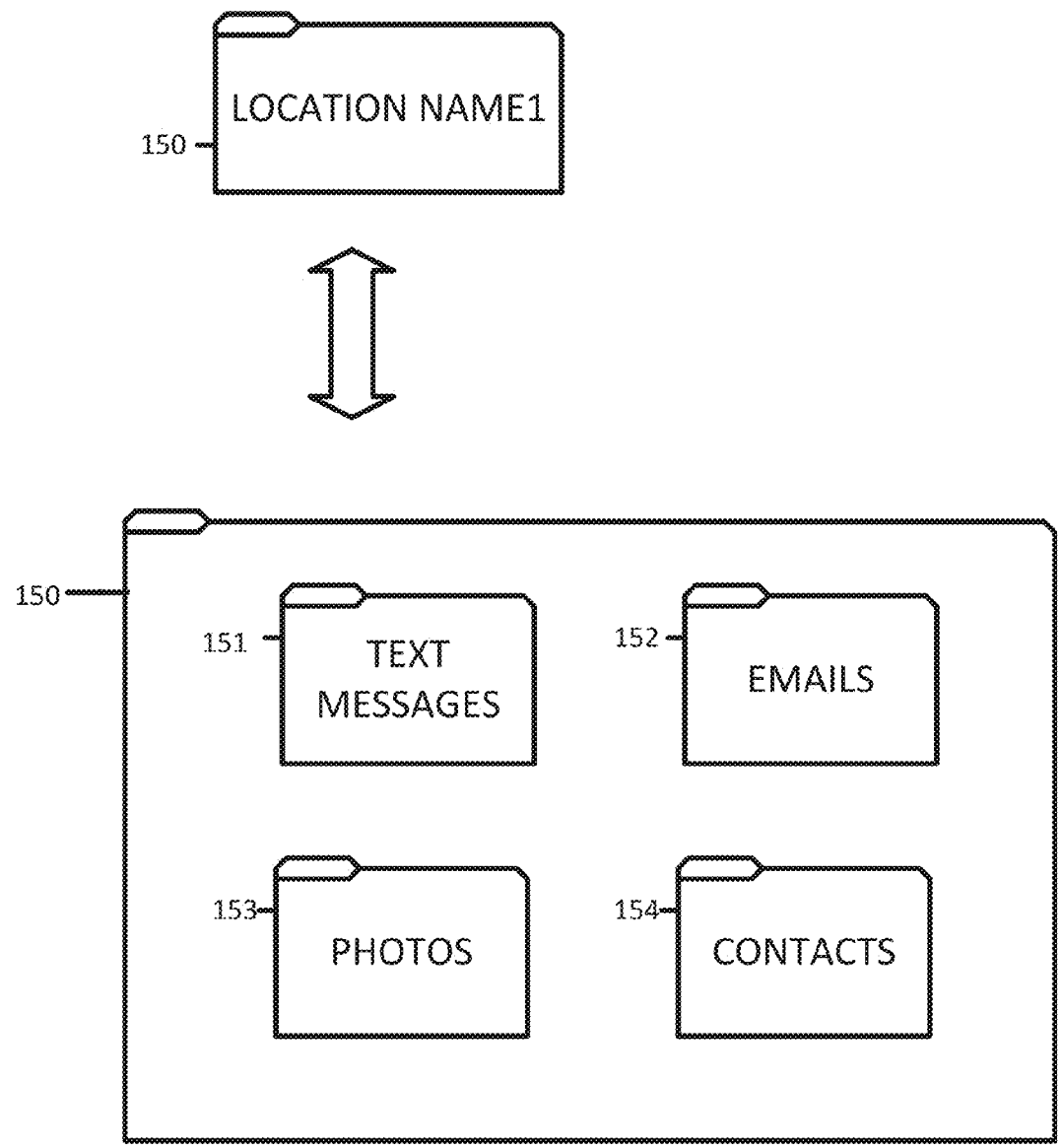
FIG. 6 illustrates another example organization of stored objects.

FIG. 6 illustrates an example organization of stored objects based on location and familiarity scores. The organization may represent the memory locations of the objects or an arrangement of display of the objects. Folder 150 is associated with a specific location. Within the folder are digital objects generated within a predetermined distance to the specific location. The digital objects may include text messages 151, emails 152, photos 153, and contacts 154. The name of the folder is defined by the familiarity score for the geographic locations of the digital objects. The folder name specificity is a function of the familiarity score. The lower the familiarity score the wider geographic area of objects in the folder1 150.

Figure 7:
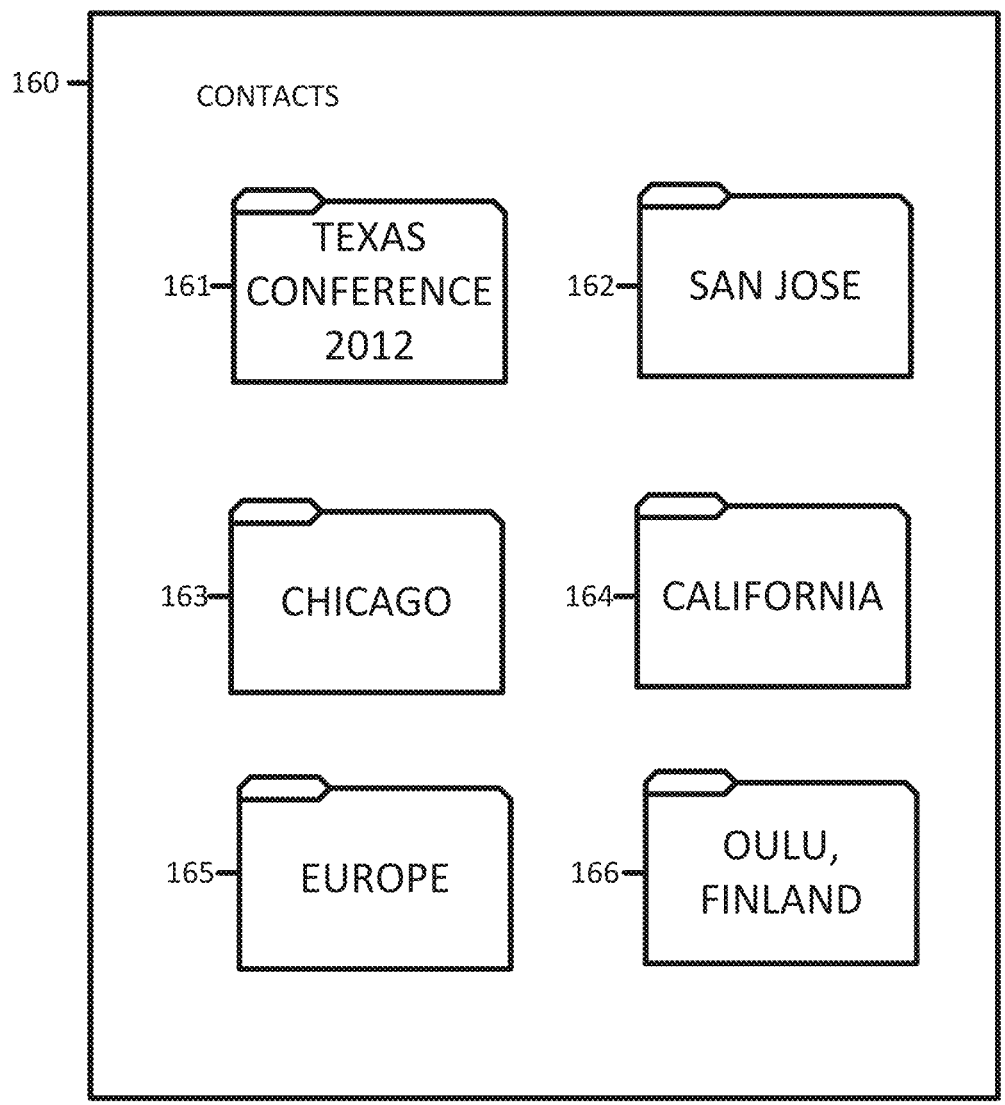
FIG. 7 illustrates an example organization of contacts.

FIG. 7 illustrates an example organization of contacts according to familiarity score or distance. A set of contacts is stored in list 160. When a new contact is entered, the mobile device 122 records the current geographic location. For example, list 160 includes a group of contacts for Oulu, Finland 166, a group of contacts for Europe 165 (excluding Oulu), a group of contacts for California 164, a group of contacts for Chicago 163, a group of contacts for San Jose 162, and a group of contacts for a conference attended in Texas 161. The contacts are grouped according to the location of the mobile device 122 when the contact was created. The specificity of the names for the folders 161-166 may be based on familiarity scores. For example, the amount of time that the mobile device 122 has been in a specific region may determine a familiarity score for the region. For example, the mobile device in FIG. 7 may make frequent trips to Oulu, Finland but rarely other locations in Europe. The low familiarity scores for the rest of Europe results in a low specificity location name and the high familiarity score for Oulu results in a high specificity location name.

Figure 8:
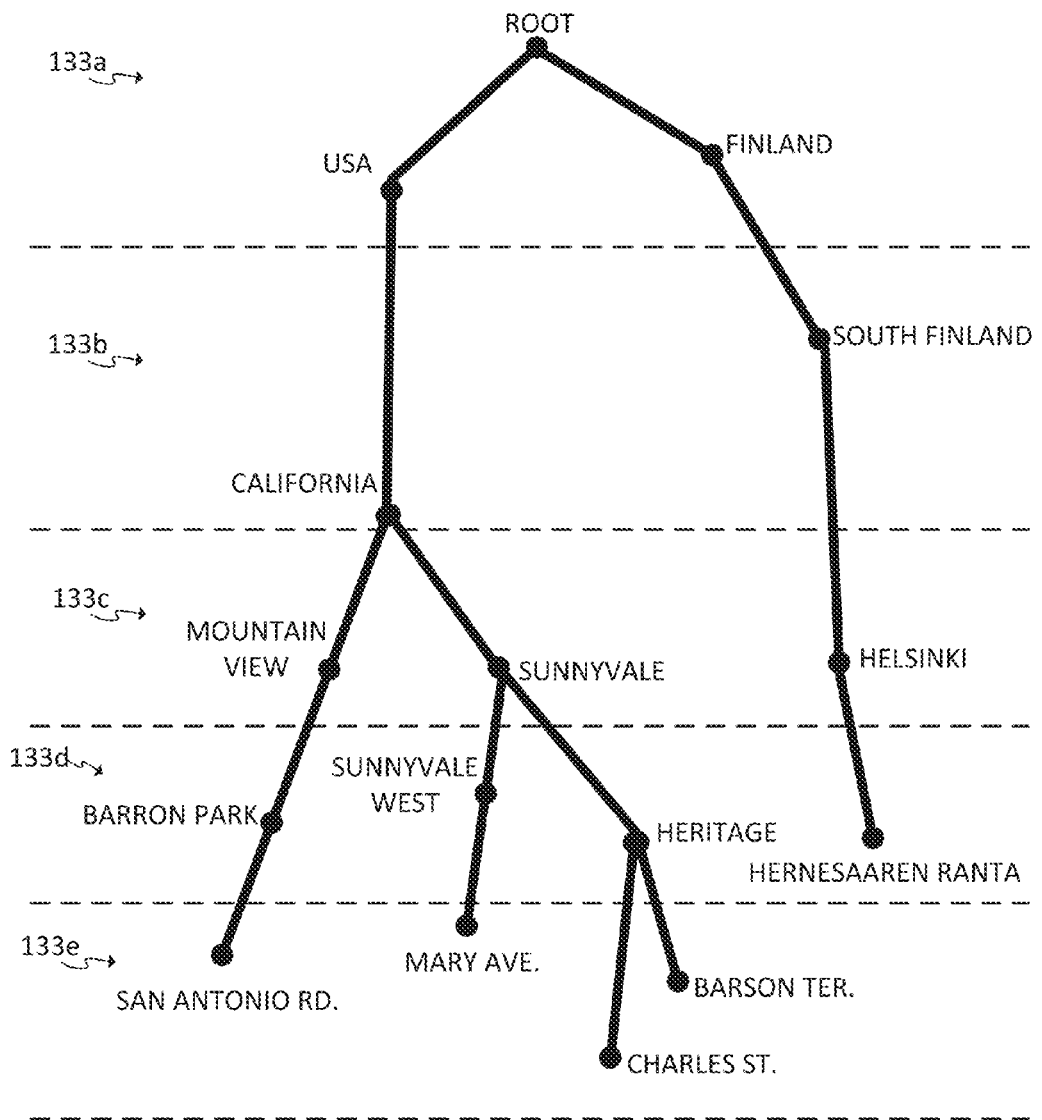
FIG. 8 illustrates an example hierarchy of geographic naming.

FIG. 8 illustrates an example hierarchy of geographic naming. The levels of specificity for location based named may be organized in a tree with multiple levels 133a-e. In one example, level 133a is a country name, level 133b is a state name, level 133c is a city name, level 133d is a neighborhood name, and level 133e is a street address. The server 125 or mobile device 122 is configured to select one of the levels according to the familiarity score. In one example, the mobile device 122 is configured to prompt the user when a digital object is created to select one or more of the levels. The user may provide input to provide one level of the hierarchy for the mobile device 122 and another level of the hierarchy for other users. Alternatively or in addition, the mobile device 122 may allow a user to click on a name (e.g., when the name is not recognized), and in response, select a name higher on the hierarchy of names.

Figure 9:
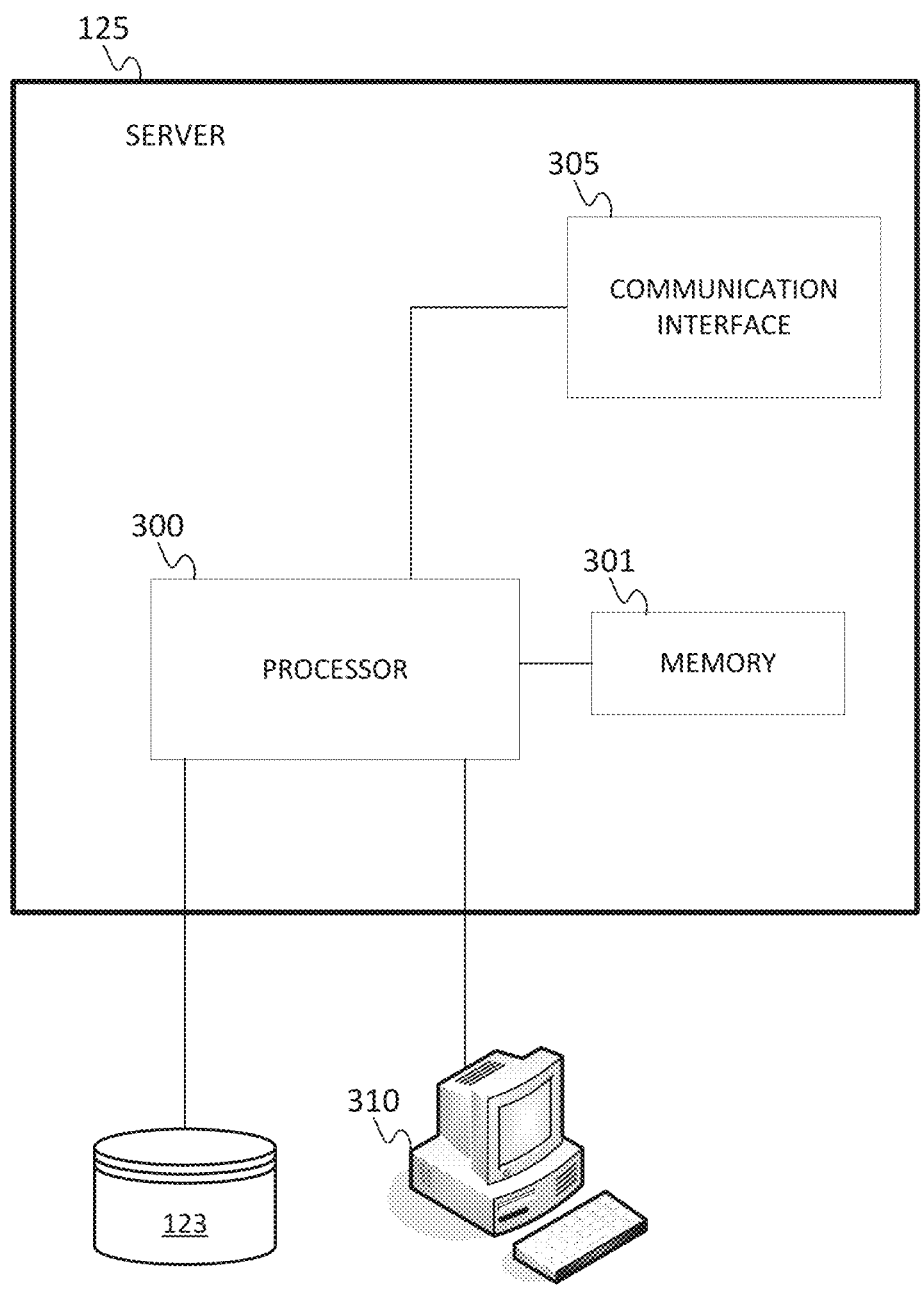
FIG. 9 illustrates an exemplary server of the system of FIG. 1.

FIG. 9 illustrates an exemplary server of the system of FIG. 1. The server 125 is configured to assign specificity to location-based names. The server 125 includes a processor 300, a communication interface 305, and a memory 301. The server 125 may be coupled to a database 123 and a workstation 310. The workstation 310 may be used as an input device for the server 125. In addition, the communication interface 305 is an input device for the server 125. The communication interface 305 receives data indicative of use inputs made via the workstation 128 or the mobile device 122.

The memory 301 is configured to store multiple names for geographic locations. The multiple names may be a geocoding chain of hierarchal locations. The geocoding chain may include a country name, a state name, a county name, a city name, a neighborhood name, and a specific street address for a single geographic location. Each level of the geocoding chain encompasses a different geographic range. The memory 301 may store the entire or a part of the geocoding chain for each data file generated by the mobile device 122.

The processor 300, which may be any type of controller, is configured to receive data indicative of past knowledge of a user of the mobile device 122 with the geographic location. In one example, the data is binary (e.g., yes or no) for whether the mobile device 122 has previously had any associations with the geographic locations. The data may be a familiarity score. The familiarity may be based on any combination of the data stored on the mobile device 122, past or current locations of the mobile device 122, content accessed by the mobile device 122, or social networking relationships associated with the mobile device 122.

The data stored on the mobile device 122 may be analyzed to calculate a familiarity score for the geographic location.

For example, locations of photographs stored in the mobile device may be compared to the geographic location of the new data file, which may also be a photograph. If a predetermined number (e.g., 5, 10, or 20) or more of the stored photographs are within a distance range (e.g., 1 mile or 100 miles) to the new data file, then the mobile device 122 is familiar with the geographic location and a specific name is given to the data file. Alternatively, the mobile device 122 may perform a text search for the geographic location to determine whether the geographic location is a familiar location.

Recent or past locations of the mobile device 122 may be used to calculate the familiarity score. The location of the mobile device 122 may be logged. When a new data file is generated, the current location of the mobile device 122 is detected by position circuitry (e.g., global positioning system). Distances from the current location to past locations from the log are calculated. If a specific number (e.g., 1, 5, or 10) of distances are within a range (e.g., 10 miles, 100 miles) to current location, the data file is assigned a specific name. If fewer distances are near the current location, the data file is assigned a general name.

Content that has been accessed by the mobile device 122 may be used to calculate the familiarity score. For example, the mobile device 122 may be configured to filter data for geographic locations. When any locations are in the data, the mobile device 122 logs the locations as familiar locations. For example, the geographic database may include a list of location names. When a website is accessed that includes one of the location name, the location is logged as a familiar location. When the mobile device 122 is near the location and generates a data file, the data file is assigned a specific name.

The familiarity score may be based on contacts or friends associated with the mobile device 122. For example, each contact or friend may be associated with a home location. The home location may be entered into a social networking service. The home location may be detected by mobile devices of the contacts. The mobile device 122 may compare the current location to the home locations of the contact to determine whether the current location is a familiarly location. When the number of contacts within a predetermined range (e.g., 50 miles or 100 miles) exceeds a threshold (e.g., 1, 5, or 10 contacts), then the data file is assigned a specific name. Otherwise, the data file is assigned a general name.

The names may be assigned to the data file by the processor 300. The processor 300 is configured to select one of the names according to the familiarity score. The names may include multiple geocoding references for a single geographic location. Example geocoding references may be country name, city name, district name, and address. Any number of geocoding references may be used as a threshold range may be assigned to each geocoding reference. The memory 301 is configured to store the thresholds.

The processor may also store a date, day of the week and/or time with the data file. For example, when a digital photograph is taken by the mobile device 122, at least data indicative of the current location of the mobile device 122 is sent to the processor 300. The processor generates a label for the digital photograph. Example labels include "Saturday at Mom's House" and "July in Honolulu."

Figure 10:
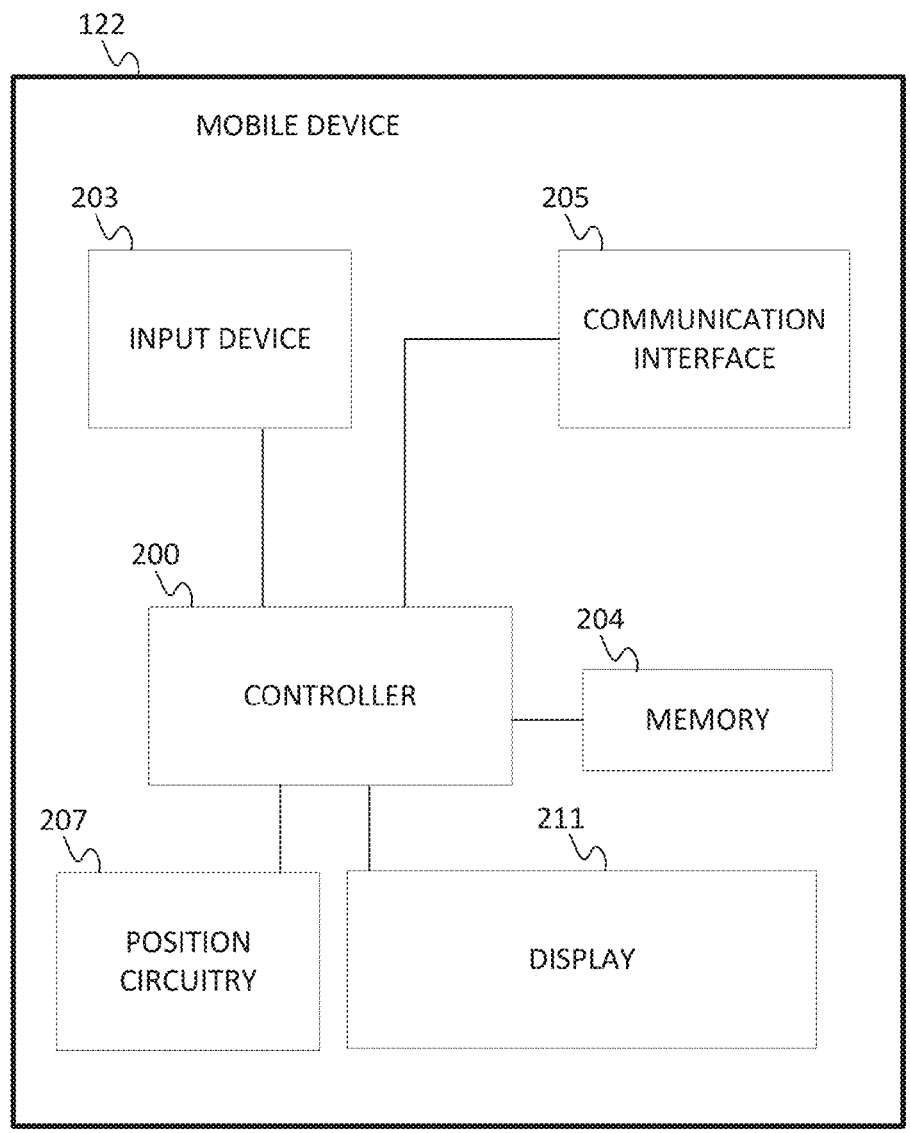
FIG. 10 illustrates an exemplary mobile device of the system of FIG. 1.
Figure 11:
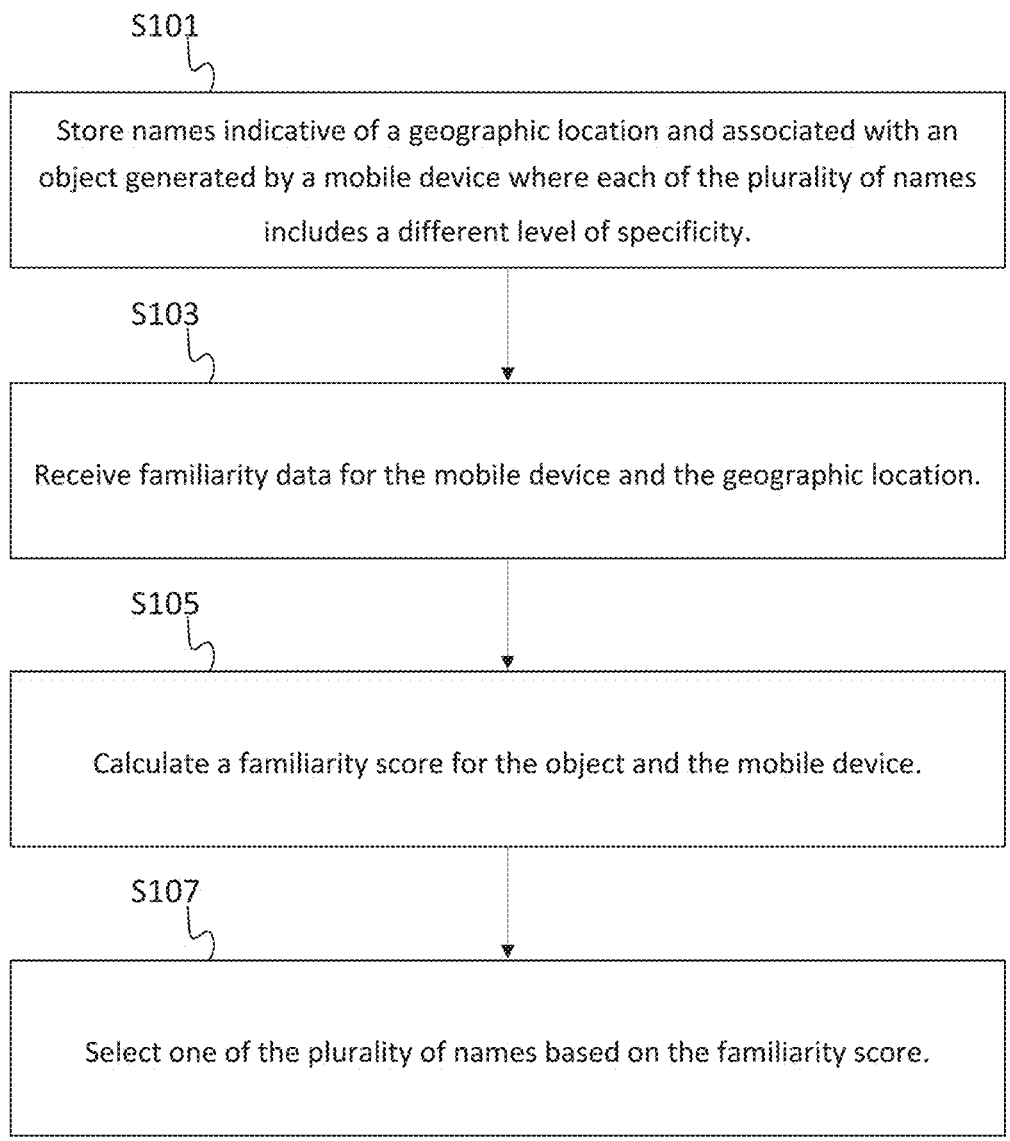
FIG. 11 illustrates another example flowchart for location based naming.

FIG. 10 illustrates an exemplary mobile device of the system of FIG. 1. The mobile device 122 may be referred to as a navigation device. The mobile device 122 includes a controller 200, a memory 201, an input device 203, a communication interface 205, position circuitry 207, a camera 209, and a display 211. The workstation 128 may include at least a memory and processor and may be substituted for the mobile device in the following endpoint-based embodiments. In the following endpoint-based embodiments, the mobile device 122 or the workstation 128 performs a majority of the processing. FIG. 11 illustrates an example flowchart for assigning location-based names at different levels of specificity, which is described in relation to the mobile device 122 but may be performed by another device. Additional, different, or fewer acts may be provided.

At act S101, the memory 204 stores location based names for a geographic location. Alternatively, the location based names for the geographic location may be stored in memory 301 of the server 125 or the database 123. The names include at least one specific name (e.g., an address or point of interest name) and at least one general name (e.g., a state or a region). The names may be received from a geographic database that includes a geocoding tree of various levels of specificity for individual locations.

At act S103, the mobile device 122 collects familiarity data for the mobile device 122 and the geographic location. The familiarity data indicates how familiar the user of the mobile device 122 is with the geographic location. The familiarity data may include the geo-locations of photographs taken or stored by the mobile device 122. The familiarity data may include locations that the mobile device 122 has visited.

At act S105, the controller 200 calculates a familiarity score for the object and the mobile device 122. The familiarity score may be a number from 1 to 100. The familiarity score may be a count of the number of digital objects associated with locations within a distance to the new geographic locations. For example, 20 digital photographs taken in Chicago and 5 contacts with Chicago area codes may result in a familiarity score of 25. The calculation may be weighted. For example, related contacts may increase the familiarity score twice as much as related photographs. Alternatively, the processor 300 of the server 125 performs act S105.

At act S107, the controller 200 selects one of the names based on the familiarity score. Higher familiarity scores are assigned more specific names and lower familiarity scores are assigned more general names. When the digital object is transmitted to another device or another user logs into the mobile device 122, the name may be automatically changed. Alternatively, the processor 300 of the server 125 performs act S107.

The input device 203 is configured to receive a selection for defining the names for the geographic location. For example, the user may specify that some users see the label "Home" and other users see "123 Elm St." The user may specify the threshold levels that the familiarity scores are compared to. The input device 203 may be one or more buttons, keypad, keyboard, mouse, stylist pen, trackball, rocker switch, touch pad, voice recognition circuit, or other device or component for inputting data to the mobile device 122. The input device 203 and the display 211 may be combined as a touch screen, which may be capacitive or resistive. The display 211 may be a liquid crystal display (LCD) panel, light emitting diode (LED) screen, thin film transistor screen, or another type of display.

The positioning circuitry 207 is optional and may be excluded for the map-related functions. The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 201 and/or memory 301 may be a volatile memory or a non-volatile memory. The memory 201 and/or memory 301 may include one or more of a read only memory (ROM), random access memory (RAM), a flash memory, an electronic erasable program read only memory (EEPROM), or other type of memory. The memory 201 and/or memory 301 may be removable from the mobile device 100, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
    storing a plurality of names indicative of a geographic location, wherein each of the plurality of names is associated with an object and each of the plurality of names includes a different level of specificity of the geographic location;
    receiving familiarity data for a user at the geographic location, wherein the familiarity data describes a quantity of the data files generated by a mobile device of the user within a predetermined distance of the geographic location and stored in the mobile device;
    calculating, with a processor, a familiarity score for the object based on the familiarity data;
    comparing the familiarity score to a threshold; and
    selecting, with the processor, one of the plurality of names based on the familiarity score, wherein a specific name is selected for the geographic location of the object when the familiarity score exceeds the threshold and a general name for the geographic location of the object when the familiarity score is less than the threshold.

2. The method of claim 1, further comprising:
    displaying the object and the selected one of the plurality of names.

3. The method of claim 1, further comprising:
    organizing a file structure to store the object according to the selected one of the plurality of names.

4. The method of claim 1, wherein the familiarity data is based on a distance from the mobile device to the geographic location.

5. The method of claim 1, wherein the familiarity data is based on a quantity of objects generated by mobile devices with a predetermined distance of the geographic location.

6. The method of claim 1, wherein the object is an email, a text message, or a contact.

7. The method of claim 1, wherein the object is a digital photograph or video recording.

8. The method of claim 1, wherein the plurality of names for the different levels of specificity of the geographic location includes a point of interest name, a city name, and a state name.

9. An apparatus comprising:
    a memory configured to store a plurality of names indicative of a geographic location, wherein each of the plurality of names is associated with a data file generated by a mobile device and each of the plurality of names encompasses a different geographic range; and
    a controller configured to receive a familiarity score for the data file and the mobile device, compare the familiarity score to a threshold level, and select one of the plurality of names according to the familiarity score,
    wherein the plurality of names includes a specific name selected when the familiarity score exceeds the threshold level a general name selected when the familiarity score is less than the threshold level,
    wherein the controller is configured to calculate the familiarity score based on a quantity of data files generated by the mobile device within a predetermined distance of the geographic location and stored in the memory.

10. The apparatus of claim 9, wherein the plurality of names includes multiple geocoding references.

11. The apparatus of claim 10, wherein the multiple geocoding references include country name, city name, district name, and address.

12. The apparatus of claim 9, wherein the controller is configured to calculate the familiarity score based on a distance from the geographic location to a current position of the apparatus.

13. The apparatus of claim 9, wherein the controller is configured to calculate the familiarity score based on a number of data files associated with the geographic location and stored in the memory.

14. The apparatus of claim 13, wherein the controller is configured to transition from the general name to the specific name when the familiarity score reaches the threshold level.

15. The apparatus of claim 9, wherein the data file is a digital photograph or video recording.

16. A non-transitory computer readable medium including instructions that when executed are operable to:
    store a specific name indicative of a geographic location and a generic name indicative of the geographic location;
    receive a request to generate a data file associated with the geographic location;
    calculate a familiarity score for a user at the geographic location, wherein the familiarity score is based on a quantity of the data files generated by a mobile device of the user within a predetermined distance of the geographic location and stored in the mobile device;
    compare the familiarity score to a threshold level;
    select the specific name as a display name if the familiarity score exceeds the threshold level; and
    select the generic name as the display name if the familiarity score is less than the threshold level.

17. The non-transitory computer readable medium of claim 16, the instructions configured to:

display the data file and the display name for the geographic location.

\* \* \* \* \*